US006364926B1

(12) United States Patent
Gryzik et al.

(10) Patent No.: US 6,364,926 B1
(45) Date of Patent: Apr. 2, 2002

(54) CONCENTRATED LIQUID ADJUVANT AND FERTILIZER

(75) Inventors: Frank A. Gryzik, Arlington Heights; James D. Reiss, West Dundee, both of IL (US)

(73) Assignee: Precision Laboratories, Inc., Northbrook, IL (US)

( * ) Notice: Subject to any disclaimer, the term of this patent is extended or adjusted under 35 U.S.C. 154(b) by 0 days.

(21) Appl. No.: 09/552,900

(22) Filed: Apr. 20, 2000

Related U.S. Application Data

(60) Provisional application No. 60/132,047, filed on Apr. 30, 1999.

(51) Int. Cl.[7] ................................................ A01N 25/02

(52) U.S. Cl. ................................ 71/64.1; 71/34; 71/59; 71/61

(58) Field of Search ................................ 71/34, 59, 61, 71/64.1

(56) References Cited

U.S. PATENT DOCUMENTS

| | | | | | |
|---|---|---|---|---|---|
| 5,877,112 | A | * | 3/1999 | Roberts et al. | 504/116 |
| 5,906,961 | A | * | 5/1999 | Roberts et al. | 504/116 |
| 5,906,962 | A | * | 5/1999 | Pallas et al. | 504/116 |
| 6,206,946 | B1 | * | 3/2001 | Hayashi et al. | 71/31 |

* cited by examiner

*Primary Examiner*—Chhaya D. Sayala
(74) *Attorney, Agent, or Firm*—Marshall, Gerstein & Borun

(57) ABSTRACT

A concentrated liquid adjuvant and fertilizer composition containing a nitrogen source, an ampholytic surfactant, a drift control agent/deposition aid, and a carrier is disclosed. The concentrated composition is phase stable, and provides a nitrogen source and/or adjuvant, and a drift control agent/deposition aid, in a single package.

18 Claims, No Drawings

CONCENTRATED LIQUID ADJUVANT AND FERTILIZER

CROSS REFERENCE TO RELATED APPLICATIONS

This application claims the benefit of provisional U.S. application Ser. No. 60/132,047, filed Apr. 30, 1999.

FIELD OF THE INVENTION

The present invention relates to a concentrated liquid adjuvant and fertilizer containing a nitrogen source and a drift control agent/deposition aid. The present composition is phase stable over extended storage periods.

BACKGROUND OF THE INVENTION

Dry and liquid adjuvants and fertilizers are available to both the agricultural and nonagricultural markets, and each type of product has its advantages and disadvantages. For example, dry adjuvants and fertilizers have the advantages of containing a high concentration of active ingredients, and the ability to incorporate various ingredients into the composition to increase the efficacy of the composition. However, many dry adjuvants and fertilizers have a disadvantage in that they must be dissolved before use, which can be hazardous and require substantial mixing and long dissolving times.

In addition, the use of dry fertilizers and adjuvants are problematic because their solubility in water varies with various water qualities throughout the United States. Water temperatures, pH hardness, and mineral content all affect the ease of dispersing or dissolving the fertilizer and adjuvants into the spray mixture. This unpredictable solubility has been a problem for end users applying herbicides to kill weeds. The end users typically prepare herbicidal mixtures using cold water, under varying conditions, and frequently outdoors where solubility problems cannot be satisfactorily resolved. The end users then face the problem of applying a suspension of fertilizer and adjuvant in water with the herbicide. The suspension can plug conveying lines, or cause an uneven application of the fertilizer and herbicide on vegetation, which results in an uneven kill rate and directly exposes an end user preparing the solution to undesirable herbicide and fertilizer contact.

In addition, significant differences in particle sizes between the individual components in a dry product can result in particle separation during shipping and/or storage. This leads to a nonhomogeneous composition which, if applied without remixing, can lead to poor results or cause damage to treated vegetation. Furthermore, inherent tackiness or particle fines generated through attrition can result in compaction and/or caking before the end user applies the dry adjuvant and fertilizer.

Liquid adjuvants and fertilizers overcome the disadvantages of long dissolving times and particle separation. But, due to solubility limitations, liquid adjuvants and fertilizers are limited in the number and amount of components present in the liquid composition. In addition, incompatibilities between different composition components makes several liquid fertilizer compositions impossible to manufacture or store for extended time periods.

The inability to solubilize high percentages of active components in a liquid adjuvant or fertilizer is a major disadvantage. In particular, concentrated liquid adjuvants and fertilizers are required to avoid the high cost of shipping large amounts of water. Concentrated liquid adjuvants and fertilizers also have the problem of phase stability because solid components tend to precipitate or settle from the composition, or liquid components tend to form separate liquid phases.

For both dry and liquid adjuvants and fertilizers, it is desirable to incorporate several different ingredients, in a high concentration (if needed), into a single composition. For example, it is desirable to incorporate a fertilizer component, an adjuvant, a spreader-sticker (i.e., a deposition aid), a drift control agent, an antifoaming agent, and a pesticide (if desirable) into a single product. A single, multipurpose composition eliminates a need for the end user to inventory a large number of different chemicals. In addition, application of the chemicals is made easier and less hazardous, with a reduced chance of misapplication, because only one product is measured, dissolved, and applied. Combination adjuvants and fertilizers also are more environmental friendly because fewer empty containers are generated, and fewer chemical containers are stored for long periods.

When an adjuvant is used in conjunction with an herbicide, a barrier to maximizing herbicide performance, especially at the lowest possible labeled use rates, is the application technique itself. In an effort to ensure the herbicide is applied within intended boundaries (i.e., does not drift), conventional sprayers utilize nozzle tips that produce large spray droplets. Research has shown that these large droplets are not retained by many species of vegetation, and, consequently, herbicide efficacy is reduced.

Attempts have been made to include various polymers with the fertilizer in a liquid formulation to improve the solubility and dispersibility of the fertilizer in water of a wide quality range. Unfortunately, commonly used polyacrylamide-based polymers and other organic polymers, such as xanthan gum, have not been successful in solubilizing or dispersing efficacious concentrations of fertilizers in an aqueous solution.

Accordingly, investigators have continually sought concentrated liquid adjuvants and fertilizers that can perform more than one function. This has proven difficult because as the concentration fertilizers and adjuvants in a liquid product increases, the phase stability of the liquid product decreases. The present invention, therefore, is directed to a concentrated liquid adjuvants and fertilizer, further containing a drift control agent/deposition aid, that is phase stable over extended storage periods.

SUMMARY OF THE INVENTION

The present invention is directed to liquid adjuvants and fertilizer compositions containing a high concentration of a nitrogen compound and a drift control agent/deposition aid. The compositions are phase stable liquids that can be stored for extended periods without observing solid-liquid or liquid-solid phase separation.

More particularly, the present invention is directed to a concentrated adjuvant and fertilizer composition containing (a) about 25% to about 35%, by weight of the composition, of a nitrogen compound in the form of an ammonium salt, (b) about 0.1% to about 5%, by weight of the composition, of an ampholytic surfactant, (c) about 0.1% to about 2.5%, by weight of the composition, of a drift control agent/deposition aid, typically a gum, like guar gum, and (d) about 55% to about 75% of a carrier comprising predominantly water.

Accordingly, one aspect of the present invention is to provide a phase stable, concentrated liquid adjuvant and fertilizer for the agricultural and nonagricultural markets.

Another aspect of the present invention is to provide a readily dispersible or soluble liquid adjuvant and fertilizer composition, that can be rapidly diluted in the field, and, after dilution, applied as a low drift spray that remains on sprayed vegetation.

Another aspect of the present invention is to provide an adjuvant that can be blended with an herbicide, like glyphosate, and water to provide a herbicidal blend for application to vegetation.

These and other aspects and advantages of the present invention will become apparent from the following, nonlimiting detailed description of the preferred embodiments.

DETAILED DESCRIPTION OF THE PREFERRED EMBODIMENTS

The present concentrated liquid adjuvant and fertilizer composition comprises, by weight of the composition:

(a) about 25% to about 35% of a nitrogen compound in the form of an ammonium salt;

(b) about 0.1% to about 5% of an ampholytic surfactant, (c) about 0.1% to about 2.5% of a drift control agent/deposition aid, and (d) about 55% to about 75% of a carrier.

The composition can further contain optional ingredients, like pH adjusters and preservatives, in an amount sufficient to perform their intended function.

The present compositions can be used as an adjuvant, a fertilizer, or both. The end use varies depending upon the identity of the nitrogen compound and the compatibility of the composition with a pesticide, like an herbicide. As used in this application, the term "adjuvant" is defined as a composition that is blended with a pesticide to improve the efficacy of the applied pesticide.

The present compositions can be used as adjuvants when compatible with the pesticide of interest. The advantages of using an adjuvant with various herbicides, like glyphosate, is well known in the art. For example, Gednalske et al. U.S. Pat. No. Re. 36,149, incorporated herein by reference, summarizes the advantages of applying glyphosate and a fertilizer, in combination, to increase the efficacy of the glyphosate. One advantage is that a combination of fertilizer and herbicide accelerates the uptake of the herbicide by leaves of the vegetation, thereby substantially increasing the efficacy of the herbicide. In addition to use as an adjuvant, the present compositions can be used as a nitrogen fertilizer due to the high concentration of nitrogen compound in the compositions.

The present compositions are phase stable liquids. The compositions typically are applied at a rate of about 2.5 to about 5 gallons of the composition diluted with sufficient water and/or other ingredients, e.g., an herbicide, to provide 100 gallons of a spray solution. The composition is readily dispersible in water, and the spray solution exhibits minimal to no drift when properly applied.

The present concentrated liquid adjuvant and fertilizer compositions contain about 25% to about 35%, and preferably about 30% to about 35%, by weight of a nitrogen compound in the form of an ammonium salt. It is preferred that the ammonium salt present in the composition is near, but below, the solubility limit of salt in 25° C. water. However, for any ammonium salt that can provide an aqueous solution containing greater than about 35% by weight of the salt, the amount of ammonium salt in the present compositions should not exceed about 35% by weight, otherwise phase stability problems can occur.

The ammonium salt utilized as the nitrogen source is not limited, and can be any ammonium salt known to persons skilled in the art. Nonlimiting examples of ammonium salts that can be used in a present adjuvant and fertilizer composition include, but are not limited to, ammonium sulfate, ammonium chloride, ammonium metaphosphate, ammonium nitrate, diammonium phosphate, monoammonium phosphate, ammonium phosphate nitrate, ammonium phosphate sulfate, ammonium polyphosphate, ammonium sulfate nitrate, ammonium thiosulfate, ammonium polysulfide, and mixtures thereof. Preferred ammonium salts are ammonium sulfate, diammonium phosphate, and monoammonium phosphate. Ammonium sulfate is an especially preferred salt for use in an adjuvant, particularly in an adjuvant designed for use with the herbicide glyphosate.

In addition to the nitrogen compound, a present concentrated liquid adjuvant and fertilizer contains about 0.1% to about 5%, and, preferably about 0.25% to about 4%, by weight of the composition of an ampholytic surfactant. To achieve the full advantage of the present invention, the composition contains about 0.5% to about 3%, by weight of the composition, of an ampholytic surfactant.

The ampholytic surfactant present in the adjuvant and fertilizer composition is stable and water soluble at both alkaline and acidic pH values. It has been found that nonionic, cationic, and anionic surfactants cannot be used in the method of preparing a present composition, and do not impart sufficient phase stability to the concentrated liquid composition.

Ampholytic surfactants can be broadly described as derivatives of secondary and tertiary amines having aliphatic radicals that are straight chain or branched, and wherein one of the aliphatic substituents contains from about 8 to 18 carbon atoms and at least one of the aliphatic substituents contains an anionic water-solubilizing group, e.g., carboxy, sulfonate, sulfate. Examples of compounds falling within this description are sodium 3-(dodecylamino)propionate, sodium 3-(dodecylamino)propane-1-sulfonate, sodium 2-(dodecylamino)ethyl sulfate, sodium 2-(dimethylamino) octadecanoate, disodium 3-(N-carboxymethyl-dodecylamino)propane-1-sulfonate, disodium octadecyliminodiacetate, sodium 1-carboxymethyl-2-undecylimidazole, and sodium N,N-bis(2-hydroxyethyl)-2-sulfato-3-dodecoxypropylamine.

More particularly, one class of ampholytic surfactants include sarcosinates and taurates having the general structural formula:

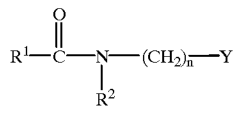

wherein $R^1$ is $C_{11}$ through $C_{21}$ alkyl, $R^2$ is hydrogen or $C_1$–$C_2$ alkyl, Y is $CO_2M$ or $SO_3M$, M is an alkali metal, and n is a number 1 through 3. In preferred embodiments, $R^1$ is predominantly $C_{12}$–$C_{14}$, or predominantly $C_{12}$–$C_{18}$. The term "predominantly" is defined as at least 75% of the $R^1$ groups are within the disclosed carbon chain length.

Another class of ampholytic surfactants is the amide sulfosuccinates having the structural formula:

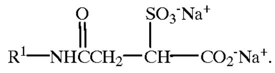

The following classes of ampholytic surfactants also can be used:

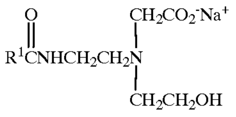

alkoamphoglycinates

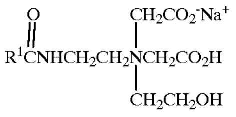

alkoamphocarboxyglycinates

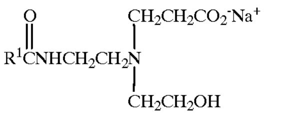

alkoamphopropionates

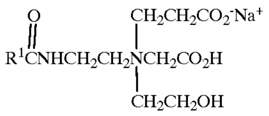

alkoamphocarboxypropionates

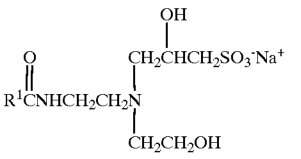

alkoamphopropylsulfonates

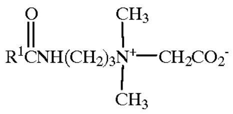

alkamidopropyl betaines

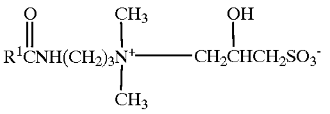

alkamidopropyl hydroxysultaine

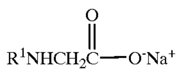

alkylaminopropionates

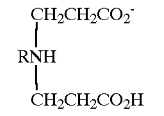

alkyliminopropionates.

Additional specific examples of ampholytic surfactants useful in the present invention are sodium coconut N-methyl taurate, sodium oleyl N-methyl taurate, sodium tall oil acid N-methyl taurate, sodium palmitoyl N-methyl taurate, cocodimethylcarboxymethylbetaine, lauryldimethylcarboxymethylbetaine, lauryldimethylcarboxyethylbetaine, cetyldimethylcarboxymethylbetaine, lauryl-bis-(2-hydroxyethyl)carboxymethylbetaine, oleyldimethylgammacarboxypropylbetaine, lauryl-bis-(2-hydroxypropyl)-carboxyethylbetaine, cocoamidodimethylpropylsultaine, stearylamidodimethylpropylsultaine, laurylamido-bis-(2-hydroxyethyl)propylsultaine, disodium oleamide PEG-2 sulfosuccinate, TEA oleamido PEG-2 sulfosuccinate, disodium oleamide MEA sulfosuccinate, disodium oleamide MIPA sulfosuccinate, disodium ricinoleamide MEA sulfosuccinate, disodium undecylenamide MEA sulfosuccinate, disodium what germamido MEA sulfosuccinate, disodium wheat germamido PEG-2 sulfosuccinate, disodium isostearamideo MEA sulfosuccinate, cocoamphoglycinate, cocoamphocarboxyglycinate, lauroamphoglycinate, lauroamphocarboxyglycinate, capryloamphocarboxyglycinate, cocoamphopropionate, cocoamphocarboxypropionate, lauroamphocarboxypropionate, capryloamphocarboxypropionate, dihydroxyethyl tallow glycinate, and mixtures thereof. Preferred surfactants are the taurates and sarcosinates. Most preferred surfactants are the taurates. Mixtures of surfactants, especially mixtures of taurates, are particularly preferred to provide maximum composition phase stability.

In addition to the ammonium salt and ampholytic surfactant, the present concentrated adjuvant and fertilizer compositions contain about 0.1% to about 2.5%, and preferably about 0.25% to about 1.75%, by weight of the composition, of a drift control agent/deposition aid. To achieve the full advantage of the present invention, the drift control agent/deposition aid is present at about 0.5% to about 1.5%, by weight of the composition.

In addition, the ampholytic surfactant and drift control agent/deposition aid are present in a weight ratio of about 3 to 1 to about 1 to 5, and preferably about 2 to 1 to about 1 to 4. To achieve the full advantage of the present invention, the weight ratio of ampholytic surfactant to drift control agent is about 1 to 1 to about 1 to 3.

A drift control agent/deposition aid helps eliminate small droplets (e.g., less than 150 microns) from a spray. The drift control agent/deposition aid helps provide a cohesive stream of spray, thereby preventing airborne spray droplets from contacting vegetation outside the intended point of application. The drift control agent/deposition aid also helps keep the spray droplets in contact with the sprayed vegetation.

The drift control agent/deposition aid typically is a polymeric compound, and more typically is a gum. Nonlimiting examples of gums, and related hydrophilic colloids, that can be used as the drift control agent/deposition aid in the present fertilizer composition include, but are not limited to, acacia, agar, algin, ammonium alginate, carboxymethyl hydroxyethylcellulose, carboxymethyl hydroxypropyl guar, carrageenan, cellulose gum, damar, dextran, dextrin, gelatin, guar gum, gum benzoin, hydroxybutyl methylcellulose, hydroxypropylcellulose, hydroxypropyl guar, hydroxypropyl methylcellulose, jalap resin, karaya gum, kelp, locust bean gum, maltodextrin, methylcellulose, olibanum, pectin, propylene glycol alginate, sandarac gum, sodium carboxymethyl dextran, tragacanth gum, xanthan gum, and mixtures thereof. A preferred drift control agent/deposition aid is guar gum. A preferred drift control agent/deposition aid is guar gum or a guar gum derivative. Various guar gum and guar gum derivatives are disclosed in Hazen U.S. Pat. Nos. 5,550,224; 5,705,173; and 5,874,096, incorporated herein by reference. Commercially available guar gums are Ag-RHO® DEP-775 and Ag-RHO® DR-2000, available from Rhodia, Cranbury, N.J.

The nitrogen compound, surfactant, and drift control agent/deposition aid are dissolved or dispersed in a carrier, typically water. The carrier is present in a concentrated liquid adjuvants and fertilizer compound in an amount of about 55% to about 75% by weight of the composition. The carrier can be water, or can be predominantly water together with a water miscible organic solvent. Nonlimiting examples of water-miscible organic solvents include $C_1$–$C_4$ alcohols, e.g., methanol, ethanol, isopropyl alcohol, and butanol, a glycol, e.g., ethylene glycol, diethylene glycol, or propylene glycol, a ketone, e.g., acetone or methyl ethyl ketone, a glycol ether, e.g., a $C_1$–$C_4$ ether of ethylene glycol or propylene glycol, and other similar water-miscible solvents.

The solvent, if present at all, comprises 0% to about 10%, and preferably 0% to about 5%, by weight of the composition. The solvent is used to help dissolve or disperse composition ingredients or to adjust composition viscosity.

The concentrated adjuvant and fertilizer composition of the present invention also can contain various optional ingredients. An optional ingredient is present in a sufficient amount to perform its intended function and not otherwise adversely affect the composition, usually 0% to about 1% by weight of the composition. The optional ingredients typically are present in a total amount of 0% to about 5%, by weight of the composition.

An example of an optional ingredient is a pH adjuster, either basic or acidic. The pH adjuster provides a proper pH range for a more facile manufacture of the composition, and a preferred final pH for the composition. A proper final pH also helps impart phase stability to the fertilizer composition. Proper pH adjustment also precludes the undesirable evolution of ammonia from the fertilizer composition.

Examples of preferred classes of basic pH adjusters are ammonia; mono-, di-, and tri-alkyl amines; mono-, di-, and tri-alkanolamines; alkali metal and alkaline earth metal hydroxides; and mixtures thereof. However, the identity of the basic pH adjuster is not limited, and any basic pH adjuster known in the art can be used. Specific, nonlimiting examples of basic pH adjusters are ammonia; sodium, potassium, and lithium hydroxide; monoethanolamine; triethylamine; isopropanolamine; diethanolamine; and triethanolamine.

Examples of preferred acidic pH adjusters are the mineral acids and polycarboxylic acids. Nonlimiting examples of mineral acids are hydrochloric acid, nitric acid, phosphoric acid, and sulfuric acid. Nonlimiting examples of polycarboxylic acids are citric acid, glycolic acid, and lactic acid. The identity of the acidic pH adjuster is not limited and any acidic pH adjuster known in the art, alone or in combination, can be used. The preferred acidic pH adjuster is a polycarboxylic acid, e.g., citric acid.

Another optional ingredient can be a preservative, which is added to the composition in a sufficient amount to prevent microbial growth in the fertilizer composition during storage of the composition. Nonlimiting examples of preservatives include formaldehyde, formaldehyde precursors, a paraben, DEDM hydantoin, diazolidinyl urea, DMDM hydantoin, glyoxal, imidazolidinyl urea, MDM hydantoin, methylchloroisothiazolinone, methyl isothiazolinone, benzoic acid, sodium benzoate, other preservatives that are well known in the art, and mixtures thereof. Additional optional ingredients include, for example, chelating agents, antifoam agents, viscosity modifiers, suspending agents, and dyes.

As previously stated, difficulties encountered in designing and manufacturing liquid adjuvants and fertilizers include incorporating a sufficiently high concentration of ingredients into the composition to render the composition cost effective and providing a phase stable composition. Providing a phase stable, concentrated composition is difficult because the active adjuvant and fertilizer components desirably are present near their saturation limit. In accordance with an important feature of the present invention, a method of manufacturing a concentrated liquid adjuvant and fertilizer is disclosed, wherein the resulting concentrated composition is phase stable over extended storage periods.

The term "phase stable" is defined as a composition that can be stored under normal storage conditions (i.e., about 10° C. to about 50° C.) for at least six months without a settling or precipitation of solid components from the composition, and without stratification of the composition into two or more liquid layers. Phase stability is an important property with respect to providing a homogeneous fertilizer composition. If phase stability is lacking, concentration differentials can result from the top to the bottom of the container. This concentration differential could result in applying an incorrect amount of fertilizer to the vegetation. To overcome such a problem, the end user would have to stir the container contents prior to each use to ensure a homogeneous solution. This is both a time-consuming and costly process.

The following examples illustrate concentrated liquid adjuvant and fertilizer compositions of the present invention and their method of manufacture.

EXAMPLE 1

| Ingredients (as added) | % (by weight) |
|---|---|
| Water | 58.50 |
| Ethanol | 2.00 |
| Monoethanolamine (99% active) | 0.15 |
| Sodium coconut N-methyl taurate[2] (24% active) | 2.50 |
| Sodium oleyl N-methyl taurate[3] (67% active) | 0.50 |
| Guar gum[1] (75% active) | 1.85 |
| Citric acid | 0.30 |
| Ammonium sulfate | 34.00 |
| Formaldehyde (37%) | 0.20 |

[1]AG-RHO ® DEP-775, Rhodia, Inc., 75% guar gum and 25% sodium oleyl N-methyl taurate;
[2]GEROPON ® TC-42, available from Rhodia, Inc.; and
[3]GEROPON ® T-77, available from Rhodia, Inc.

EXAMPLE 1

| Ingredients (as present) | % (by weight) |
|---|---|
| Water | 60.88 |
| Ethanol | 2.00 |
| Monoethanolamine (MEA) | 0.15 |
| Sodium coconut N-methyl taurate | 0.60 |
| Sodium oleyl N-methyl taurate | 0.80 |
| Guar gum | 1.40 |
| Citric acid | 0.30 |
| Ammonium sulfate | 34.00 |
| Formaldehyde | 0.07 |

The composition of Example 1 was prepared by admixing the water, ethanol, and MEA to provide an aqueous solution having a pH of about 8.5 to about 9.5. This pH range was sufficiently high to facilitate dispersion of the guar gum into the composition, and was sufficiently low such that the guar gum is not chemically degraded. Next, the sodium coconut N-methyl taurate and sodium oleyl N-methyl taurate were added to, and solubilized in, the aqueous solution with stirring at room temperature. To the resulting homogeneous solution was added the guar gum, with stirring. Stirring was continued until the guar gum was completely hydrated and dispersed. The resulting composition was a hazy dispersion. Next, the citric acid was added to the dispersion to reduce the pH to below 7.5. The resulting mixture formed a gel, which became clear when the guar gum was fully hydrated. The granular ammonium sulfate then was added to the gel slowly, with agitation. The viscosity of the resulting mixture decreased as the ammonium sulfate was added to the mixture. After addition of the ammonium sulfate was complete, the formaldehyde preservative was added to the composition. Upon standing, the viscosity of the resulting composition continued to decrease over the next 24 to 48 hours.

The concentrated liquid composition of Example 1 was a stable, opaque liquid containing about 37%–38% by weight solids, and having a specific gravity at 25° C. of 1.20, a pH of about 5 to 6, and a viscosity of 3000 cps (maximum) at 25° C. The composition of Example 1 exhibits excellent shelf life during storage at 25° C., and exhibited no phase separation after storage for 5 days at 50° C.

The composition of Example 1 can be used as a concentrated nitrogen fertilizer. For example, Example 1 was used at a rate of 2.5 gallons per 100 gallons of tank mixture for spray application of ammonium sulfate with a low drift.

The composition of Example 1 also can be used as an adjuvant. For example, Example 1 was used at a rate of 2.5 gallons per 100 gallons of a tank mixture further containing the herbicide glyphosate for spray application with a low drift and excellent spray drop retention on sprayed vegetation.

EXAMPLE 2

| Ingredient | % (by weight) (as added) | % (by weight) (as present) |
|---|---|---|
| Water | 63.00 | 64.16 |
| MEA (99%) | 0.17 | 0.17 |
| Sodium coconut N-methyl taurate[2)] (24% active) | 1.25 | 0.30 |
| Sodium oleyl N-methyl taurate[3)] (67% active) | 0.25 | .040 |
| Guar gum[1)] (75% active) | 0.93 | 0.70 |
| Citric acid | 0.20 | 0.20 |
| Ammonium sulfate | 34.00 | 34.00 |
| Formaldehyde (37%) | 0.20 | 0.07 |

The composition of Example 2 was prepared in an identical manner as the composition of Example 1 to provide an opaque, stabilized, concentrated liquid adjuvants and fertilizer composition containing 35.5% to 36.5% by weight solids, having a pH 5 to 6, a specific gravity of 1.20, and a viscosity at 25° C. (Brookfield RVT, spindle #2, 50 rpm) of 500 cps (maximum). The concentrated composition of Example 2 is applied at the rate of 5 gallons per 100 gallons of tank mix either as a fertilizer or as an adjuvant in combination with glyphosate.

What is claimed is:

1. A concentrated liquid adjuvant and fertilizer composition comprising (a) about 25% to about 35%, by weight, of a nitrogen compound in the form of an ammonium salt;

(b) about 0.1% to about 5%, by weight, of an ampholytic surfactant, (c) about 0.1% to about 2.5%, by weight, of a drift control agent/deposition aid, and (d) about 55% to about 75%, by weight, of a carrier comprising water.

2. The composition of claim 1 wherein the ammonium salt is selected from the group consisting of ammonium sulfate, ammonium chloride, ammonium metaphosphate, ammonium nitrate, diammonium phosphate, monoammonium phosphate, ammonium phosphate nitrate, ammonium phosphate sulfate, ammonium polyphosphate, ammonium sulfate nitrate, ammonium thiosulfate, ammonium polysulfide, and mixtures thereof.

3. The composition of claim 1 wherein the ammonium salt is selected from the group consisting of ammonium sulfate, diammonium phosphate, and monoammonium phosphate.

4. The composition of claim 1 wherein the weight ratio of ampholytic surfactant to drift control agent is about 3 to 1 to about 1 to 5.

5. The composition of claim 1 wherein the weight ratio of ampholytic surfactant to drift control agent is about 1 to 1 to about 1 to 3.

6. The composition of claim 1 wherein the ampholytic surfactant is selected from the group consisting of an amide sulfosuccinate, an alkoamphoglycinate, an alkoamphocarboxyglycinate, an alkoamphopropionate, an alkoamphocarboxypropionate, an alkoamphopropylsulfonate, an alkamidopropyl betaine, an alkamidopropyl hydroxysultaine, an alkylaminopropionate, an alkyliminopropionate, a taurate, a sarcosinate, and mixtures thereof.

7. The composition of claim 1 wherein the ampholytic surfactant comprises a taurate or a sarcosinate having the general structural formula:

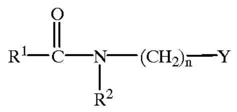

wherein $R^1$ is $C_{11}$ through $C_{21}$ alkyl, $R^2$ is hydrogen or $C_1$–$C_2$ alkyl, Y is $CO_2M$ or $SO_3M$, M is an alkali metal, and n is a number 1 through 3.

8. The composition of claim 7 wherein the ampholytic surfactant comprises a mixture of a first sarcosinate or taurate wherein $R^1$ is predominantly $C_{12}$ through $C_{14}$ and a second sarcosinate or taurate wherein $R^1$ is predominantly $C_{16}$ through $C_{18}$.

9. The composition of claim 8 wherein the ampholytic surfactant comprises sodium coconut N-methyl taurate and sodium oleyl N-methyl taurate.

10. The composition of claim 1 wherein the drift control agent/deposition aid is selected from the group consisting of acacia, agar, algin, ammonium alginate, carboxymethyl hydroxyethylcellulose, carboxymethyl hydroxypropyl guar, carrageenan, cellulose gum, damar, dextran, dextrin, gelatin, guar gum, gum benzoin, hydroxybutyl methylcellulose, hydroxypropylcellulose, hydroxypropyl guar, hydroxypropyl methylcellulose, jalap resin, karaya gum, kelp, locust bean gum, maltodextrin, methylcellulose, olibanum, pectin, propylene glycol alginate, sandarac gum, sodium carboxymethyl dextran, tragacanth gum, xanthan gum, and mixtures thereof.

11. The composition of claim 1 wherein the drift control agent/deposition comprises guar gum or a guar gum derivative.

12. The composition of claim 1 wherein the drift control agent/deposition aid composition comprises guar gum.

13. The composition of claim 1 wherein the carrier further comprises a water-miscible organic solvent.

14. The composition of claim 1 wherein the composition is phase stable for at least six months at 25° C.

15. The composition of claim 1 comprising about 0.25% to about 4%, by weight, of an ampholytic surfactant, and about 0.25% to about 1.75%, by weight, of a drift control agent/deposition aid.

16. The composition of claim 1 comprising about 0.5% to about 3%, by weight, of an ampholytic surfactant, and about 0.5% to about 1.5%, by weight, of a drift control agent/deposition aid.

17. The composition of claim 1 comprising (a) about 25% to about 35%, by weight, of ammonium sulfate;

(b) about 0.1% to about 5%, by weight, of sodium coconut N-methyl taurate, sodium oleyl N-methyl taurate, or a mixture thereof, (c) about 0.1% to about 2.5%, by weight, of guar gum, (d) about 55% to about 75%, by weight, of water, and (e) 0% to about 10%, by weight, of a water-miscible organic solvent selected from the group consisting of methanol, ethanol, isopropyl alcohol, and butanol, ethylene glycol, diethylene glycol, propylene glycol, acetone methyl ethyl ketone, a $C_1$–$C_4$ ether of ethylene glycol or propylene glycol, and mixtures thereof.

18. A method of manufacturing a composition of claim 1 comprising (a) providing an aqueous solution having a pH of about 8.5 to about 9.5;

(b) then adding an ampholytic surfactant to the aqueous solution to provide a homogeneous surfactant solution;

(c) then adding the drift control agent/deposition aid to the surfactant solution and dispersing the drift control agent/deposition aid in the solution, (d) then adding a sufficient amount of an acid to adjust the pH of the dispersion of step (c) to about 5 to less than 7.5, to form a gel;

(e) then adding the nitrogen compound to the gel to provide the liquid composition.

* * * * *